United States Patent
Sterns

(10) Patent No.: US 10,060,520 B2
(45) Date of Patent: Aug. 28, 2018

(54) TRANSMISSION FOR A DRIVE ARRANGEMENT OF A DRIVEN MACHINE

(71) Applicant: RENK Aktiengesellschaft, Augsburg (DE)

(72) Inventor: Dietmar Sterns, Kissing (DE)

(73) Assignee: RENK Aktiengesellschaft, Augsburg (DE)

( * ) Notice: Subject to any disclaimer, the term of this patent is extended or adjusted under 35 U.S.C. 154(b) by 160 days.

(21) Appl. No.: 15/177,847

(22) Filed: Jun. 9, 2016

(65) Prior Publication Data
US 2016/0369886 A1    Dec. 22, 2016

(30) Foreign Application Priority Data
Jun. 16, 2015   (DE) .................. 10 2015 007 551

(51) Int. Cl.
*F16H 57/04*    (2010.01)
*F16H 57/027*   (2012.01)

(52) U.S. Cl.
CPC ....... *F16H 57/0435* (2013.01); *F16H 57/027* (2013.01); *F16H 57/0409* (2013.01); *F16H 57/0441* (2013.01)

(58) Field of Classification Search
CPC .............. F16H 57/0435; F16H 57/027; F16H 57/0409; F16H 57/0441
See application file for complete search history.

(56) References Cited

U.S. PATENT DOCUMENTS

| | | | | |
|---|---|---|---|---|
| 2,064,703 A | * | 12/1936 | Van De Graaff | F16J 15/40 277/430 |
| 3,489,034 A | * | 1/1970 | Moore | F16H 57/027 74/606 R |
| 3,942,716 A | * | 3/1976 | Jacobson | B04B 9/12 184/6.16 |
| 4,168,638 A | * | 9/1979 | Usui | F16H 61/0021 475/136 |
| 4,632,650 A | * | 12/1986 | Frieden | F04C 27/009 277/412 |
| 4,697,553 A | * | 10/1987 | Lie | F01M 3/00 123/196 R |
| 4,750,456 A | * | 6/1988 | Ladrach | F01M 11/061 123/196 S |
| 4,762,201 A | * | 8/1988 | Malik | F01M 1/12 184/6.13 |

(Continued)

*Primary Examiner* — Michael A Riegelman
(74) *Attorney, Agent, or Firm* — Cozen O'Connor

(57) ABSTRACT

The transmission for a drive arrangement of a driven machine with an oil supply system has at least one oil collecting receptacle for supplying components of the transmission with oil for lubrication and/or cooling. The oil is supplied from the respective oil collecting receptacle via an oil supply line and an oil supply pump and is returned to the respective oil collecting receptacle subsequently via an oil return line. A vacuum pump is associated with at least one oil collecting receptacle for supplying components of the transmission with oil, and the respective oil collecting receptacle can be evacuated or partially evacuated via the vacuum pump and at least one partial interior of the transmission can be evacuated or partially evacuated indirectly via the oil collecting receptacle via the vacuum pump accompanied by the generation of a defined negative pressure.

11 Claims, 2 Drawing Sheets

(56) References Cited

U.S. PATENT DOCUMENTS

| | | | | |
|---|---|---|---|---|
| 5,101,936 | A * | 4/1992 | Paredes | F01M 1/12 |
| | | | | 123/196 S |
| 6,374,949 | B2 * | 4/2002 | Schwertberger | F16H 57/027 |
| | | | | 184/6.4 |
| 7,954,599 | B2 | 6/2011 | Antonetti | |
| 8,997,934 | B2 * | 4/2015 | Nielsen | F03D 11/0008 |
| | | | | 184/4 |
| 2005/0139427 | A1 * | 6/2005 | Antonetti | F16H 57/0413 |
| | | | | 184/6.12 |
| 2009/0050410 | A1 * | 2/2009 | Berberich | F01D 11/003 |
| | | | | 184/6.11 |
| 2016/0160856 | A1 * | 6/2016 | Wallin | F04B 53/18 |
| | | | | 62/468 |
| 2016/0305537 | A1 * | 10/2016 | Sterns | F16H 57/02 |

\* cited by examiner

TRANSMISSION FOR A DRIVE ARRANGEMENT OF A DRIVEN MACHINE

BACKGROUND OF THE INVENTION

1. Field of the Invention

The invention is directed to a novel transmission for a drive arrangement of a driven machine as well as to a drive arrangement of a driven machine having a transmission of this kind.

2. Background of the Invention

It is known from practice that a drive arrangement for a driven machine which is constructed, for example, as a compressor, pump or generator, comprises a drive unit and a transmission which is connected between the drive unit and the driven machine. The drive unit can be a motor or a turbine, for example. The transmission which is connected between the drive unit and driven machine converts speeds and torques supplied by the drive unit and accordingly provides the driving power of the drive unit of the driven machine.

A transmission in which a transmission interior defined by a transmission housing is divided into at least two partial interiors is known from U.S. Pat. No. 6,374,949, the content of which is incorporated herein by reference in its entirety. A first partial interior of the transmission is under atmospheric pressure and a second partial interior of the transmission is under vacuum or partial vacuum. Oil can be supplied to the partial interior of the transmission under atmospheric pressure as well as to the partial interior of the transmission under vacuum or partial vacuum in order to lubricate and/or cool components positioned in the respective partial interiors of the transmission. A vacuum pump acts on the transmission to generate the vacuum or partial vacuum in the corresponding partial interior of the transmission. The return of the oil from the partial interior of the transmission under vacuum or partial vacuum is carried out via an oil return pump acting on the respective partial interior of the transmission.

A further transmission for a drive arrangement for a driven machine is known from U.S. Pat. No. 7,954,599, the content of which is incorporated herein by reference in its entirety. In this prior art, also, a partial interior of the transmission can be evacuated or partially evacuated, for which purpose a vacuum pump acts at this partial interior of the transmission. Oil which is supplied to the components positioned in this evacuated or partially evacuated partial interior of the transmission for cooling and/or lubrication can be collected in a separate sump. An oil return pump is required for returning the oil from this separate sump in direction of an oil collecting receptacle.

Accordingly, in the transmissions known from practice, in order to evacuate the partial interior of the transmission it is necessary to allocate a vacuum pump as well as an oil return pump to the respective partial interior. The vacuum pump to be allocated to the partial interior of the transmission which is to be evacuated or partially evacuated serves to directly evacuate or partially evacuate the respective partial interior of the transmission. The oil return pump associated with the partial interior serves to return the oil from the respective evacuated or partially evacuated partial interior of the transmission in direction of an oil collecting receptacle.

There thus is a need for a transmission for a drive arrangement of a driven machine and for a drive arrangement of a driven machine with a transmission of this type in which an evacuation or partial evacuation of at least partial interiors of the transmission and the return of oil from the respective partial interior in direction of an oil collecting receptacle can be carried out more economically.

SUMMARY OF THE INVENTION

On this basis, it is an object of the present invention to provide a novel transmission for a drive arrangement of a driven machine and a drive arrangement of a driven machine having a transmission of this kind.

According to the invention, a vacuum pump is associated with at least one oil collecting receptacle proceeding from which components of the transmission can be supplied with oil, and the respective oil collecting receptacle can be evacuated or partially evacuated via the vacuum pump and at least one partial interior of the transmission can be evacuated or partially evacuated indirectly via the respective oil collecting receptacle via the vacuum pump accompanied by the generation of a defined negative pressure. In the transmission according to the invention, a vacuum pump is associated with an oil collecting receptacle of the oil supply system, and the respective oil collecting receptacle can be evacuated via the vacuum pump. The partial interior, or each partial interior, of the transmission whose components are supplied with oil for cooling and/or lubrication proceeding from the evacuated or partially evacuated oil collecting receptacle can be evacuated or partially evacuated indirectly via the evacuated or partially evacuated oil collecting receptacle. Therefore, in accordance with the invention, a partial interior of the transmission to be evacuated or partially evacuated no longer has a vacuum pump allocated to it which directly evacuates the respective partial interior; rather, the vacuum pump is associated with the respective oil collecting receptacle in order to evacuate or partially evacuate the oil collecting receptacle and, indirectly via the oil collecting receptacle, to evacuate or partially evacuate the respective partial interior of the transmission. Since the oil collecting receptacle and the respective partial interior of the transmission which are coupled with one another are under the same negative pressure, an oil return pump is no longer necessary for returning oil from the evacuated or partially evacuated partial interior of the transmission in direction of the oil collecting receptacle which is also evacuated or partially evacuated.

Preferably, the entire interior of the transmission can be evacuated accompanied by generation of the defined negative pressure. This embodiment in which the entire interior of the transmission is evacuated or partially evacuated is particularly preferred. In this case, one individual oil collecting receptacle is sufficient for the transmission. Further, only one individual vacuum pump cooperating with the oil collecting receptacle is also needed to evacuate or partially evacuate the oil collecting receptacle and to evacuate or partially evacuate the entire interior of the transmission indirectly via the oil collecting receptacle. An oil return pump for returning oil from the interior of the transmission into the oil collecting receptacle is not required.

According to a first advantageous further development of the invention, the evacuation is effected proceeding from the respective oil collecting receptacle via a separate pressure compensating line, the pressure compensating line opens into the respective oil collecting receptacle above a maximum oil fill level, and the oil return line opens into the respective oil collecting receptacle below a maximum oil fill level. According to a second, alternative advantageous further development of the invention, the evacuation is effected proceeding from the respective oil collecting receptacle via the oil return line leading to the respective oil collecting receptacle. Both further developments of the invention allow an efficient evacuation or partial evacuation of a partial interior or of the entire interior of the transmission proceeding from the oil collecting receptacle. The second advantageous further development is simpler with respect to design because no separate pressure compensating line is required. In this case, the oil return line need merely have a sufficiently large diameter and open into the oil collecting receptacle above the maximum oil fill level.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiment examples of the invention are described more fully with reference to the drawing figures. In the drawings.

DETAILED DESCRIPTION OF THE PRESENTLY PREFERRED EMBODIMENTS

The present invention is directed to a transmission for a drive arrangement of a driven machine and to a drive arrangement of a driven machine with a transmission of this type.

Figure 1:
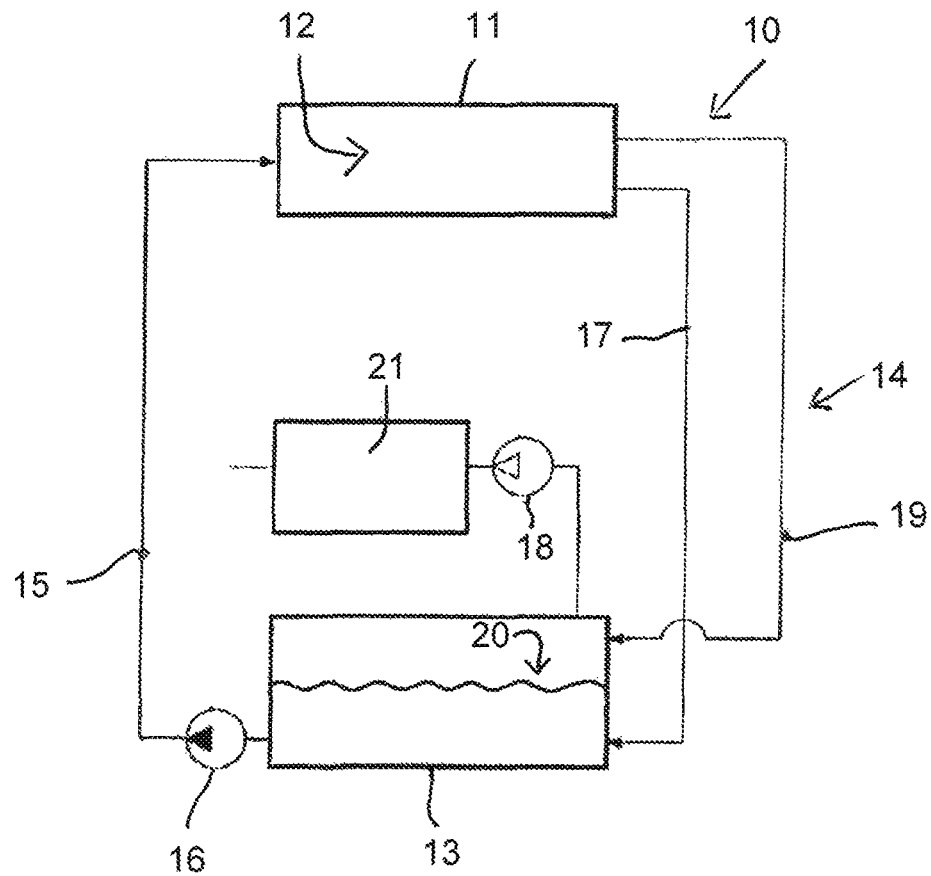
FIG. 1 is a block diagram of a transmission for a drive arrangement of a driven machine in accordance with the invention.

FIG. 1 shows a schematic block diagram of a transmission 10 according to the invention in which a transmission housing 11 of the transmission 10 defines an interior 12 of the transmission 10 in which diverse components of the transmission 10, e.g., shafts, gears, bearings and seals, are received. Oil can be supplied to the components arranged in the interior 12 of the transmission 10 for lubrication and/or cooling proceeding from an oil collecting receptacle 13. To this end, the transmission 10 comprises an oil supply system 14 which comprises an oil supply line 15 with an oil supply pump 16 and an oil return line 17 in addition to the oil collecting receptacle 13. Oil can be sucked out of the oil collecting receptacle 13 via the oil supply pump 16 and supplied via the oil supply line 15 to components positioned in the interior 12 of the transmission 10 for lubrication and/or cooling. This oil can be returned to the oil collecting receptacle 13 via the oil return line 17 proceeding from the interior 12 of the transmission 10.

In the embodiment example in FIG. 1, an individual oil collecting receptacle 13 is associated with the transmission 10 so that all of the components of the transmission 10 which are positioned in the interior 12 of the transmission housing 11 of the transmission 10 and are to be cooled and/or lubricated are supplied with oil proceeding from this oil collecting receptacle 13.

A vacuum pump 18 is associated with the oil collecting receptacle 13. The oil collecting receptacle 13 can be evacuated or partially evacuated via the vacuum pump 18, namely in such a way that a defined negative pressure is adjusted in the oil collecting receptacle 13. In so doing, according to the invention, the interior 12 of the transmission housing 11 of the transmission 10 is also indirectly evacuated or partially evacuated via the vacuum or partial vacuum generated in the oil collecting receptacle 13 so that the defined negative pressure also prevails in the interior 12 of the transmission 10.

In the embodiment example in FIG. 1, the evacuation or partial evacuation of the interior 12 of the transmission housing 11 of the transmission 10 is carried out proceeding from the oil collecting receptacle 13 via a separate pressure compensating line 19 extending between the transmission housing 11 and the oil collecting receptacle 13. The pressure compensating line 19 opens into the oil collecting receptacle 13 above a maximum oil fill level 20 of oil in the oil collecting receptacle 13. On the other hand, the oil return line 17 opens into the oil collecting receptacle 13 below this maximum oil fill level 20.

As has already been stated, the evacuation or partial evacuation of the oil collecting receptacle 13 is carried out by means of the vacuum pump 18 associated with the oil collecting receptacle 13 and the evacuation or partial evacuation of the interior 12 of the transmission housing 11 of the transmission 10 is carried out indirectly via the oil collecting receptacle 13 by means of the vacuum pump 18 associated with the oil collecting receptacle 13. An air processing device 21 cooperates with this vacuum pump 18 to remove oil particles from the air that is sucked out of the oil collecting receptacle 13 by means of the vacuum pump 18 and accordingly to prevent contamination of the environment by oil.

In the embodiment example in FIG. 1, the entire interior 12 of the transmission 10 is evacuated or partially evacuated while generating a defined negative pressure in the entire interior 12 of the transmission housing 11, namely, as has already been stated, through evacuation or partial evacuation of the oil collecting receptacle 13 and coupling of the oil collecting receptacle 13 to the interior of the transmission 10 via the pressure compensating line 19 so that the same negative pressure prevails in the oil collecting receptacle 13 and in the interior of the transmission housing 11. Therefore, oil which is supplied to the components in the interior 12 of the transmission 10 proceeding from the oil collecting receptacle 13 for lubrication and/or cooling can be guided back into the oil collecting receptacle 13 from the interior 12 of the transmission 10 solely through the use of gravity without the need for a separate oil return pump.

In contrast to the embodiment example in FIG. 1, it is possible to do without a separate pressure compensating line 19. In this case, the oil return line 17 is then used for the oil return on the one hand and for pressure coupling between the oil collecting receptacle 13 and the interior 12 of the transmission 10 on the other hand. In this case, the oil return line 17 must have a sufficiently large diameter to convey air proceeding from the interior 12 of the transmission housing 11 into the oil collecting receptacle 13 in addition to the oil to be returned. Further, the oil return line 17 should open into the oil collecting receptacle 13 above the maximum oil fill level 20 in this case.

Although the evacuation or partial evacuation of the entire interior 12 of the transmission 10 is preferred as in the embodiment example in FIG. 1, it is also possible to evacuate only a partial interior of the transmission 10 or transmission housing 11 as shown in the above mentioned U.S. Pat. No. 6,374,949. In this case, however, a separate oil collecting receptacle with separate oil supply line and separate oil return line is required for cooling and/or lubricating components which are positioned in the partial interior of the transmission 10 or transmission housing 11 which is neither evacuated nor partially evacuated.

Figure 2:
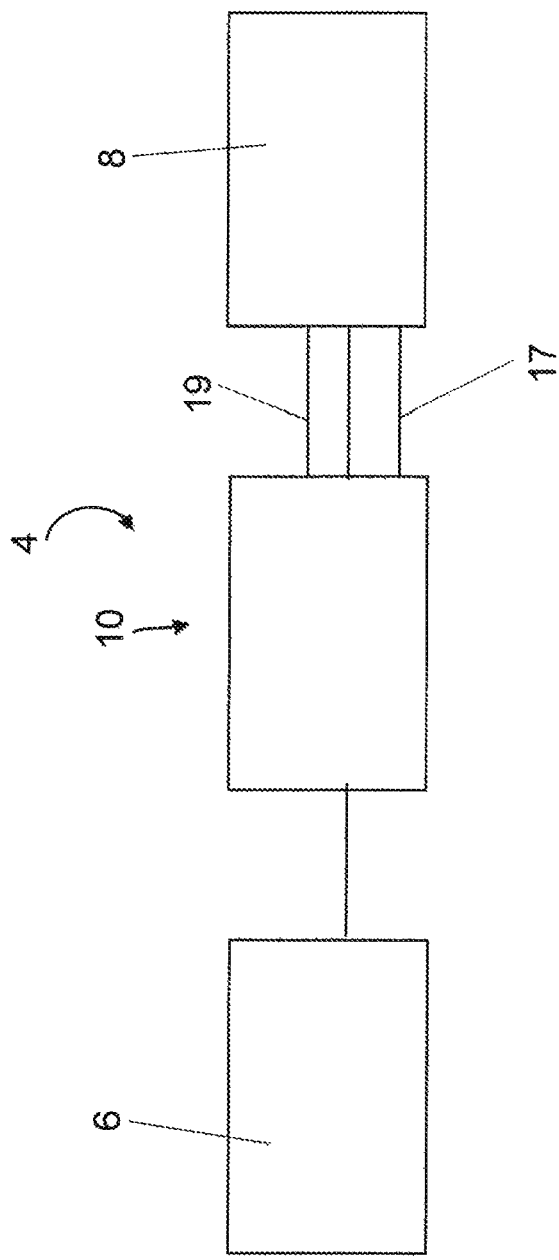
FIG. 2 is a block diagram of a drive arrangement with a transmission between a drive unit and a driven machine.

The present invention is further directed to a drive arrangement of a driven machine which comprises a transmission 10 of this type. As shown schematically in FIG. 2, the drive arrangement 4 of the driven machine 6 further comprises a drive unit 8. The transmission 10 is connected between the drive unit 8 and the driven machine 6. The drive unit 8 can be a motor or a turbine. The driven machine 6 can be a generator, a compressor or a pump. Speeds and torques supplied by the drive unit 8 are changed by the transmission 10 and supplied to the driven machine 6.

As is shown in FIG. 1 with respect to the drive arrangement according to the invention, it is preferably provided that the entire interior 12 of the transmission housing 11 of the transmission 10 is evacuated or partially evacuated proceeding from the oil collecting receptacle 13 in order to adjust a defined negative pressure in the entire interior 12 of the transmission housing 11. In this case, at least one partial interior of the drive unit can then also be evacuated for generating the defined negative pressure. This partial interior of the drive unit to be evacuated can then also be supplied with oil proceeding from the oil collecting receptacle 13 of the transmission 10 for lubricating and/or cooling components positioned in this partial interior, namely via an oil supply line leading to the partial interior of the drive unit. Oil can be returned to the shared oil collecting receptacle 13 proceeding from the partial interior of the drive unit via a corresponding oil return line. As is shown in FIG. 1 for the transmission 10, the evacuation of the partial interior of the drive unit can be carried out either via a separate pressure compensating line extending between the partial interior of the drive motor and the oil collecting receptacle 13 or, alternatively, also via an oil return line.

It is further possible in a drive arrangement to evacuate or partially evacuate also at least one partial interior of the driven machine and to generate the defined negative pressure proceeding from the oil collecting receptacle 13 of the transmission 10. In this case, the corresponding partial interior of the driven machine can then also be supplied with oil from the shared oil collecting receptacle 13, namely via a corresponding oil supply line, and the oil can be returned to the shared oil collecting receptacle 13 proceeding from the partial interior of the driven machine via a corresponding oil return line. The evacuation of the partial interior of the driven machine is then carried out proceeding from the shared oil collecting receptacle 13 either via a separate pressure compensating line or via an oil return line which extends in each instance between the shared oil collecting receptacle 13 and the respective partial interior of the driven machine.

According to a preferred embodiment form of the invention, the entire interior 12 of the transmission housing 11 of the transmission 10 can then be evacuated or partially evacuated indirectly while generating a defined negative pressure in the interior 12, specifically indirectly proceeding from the oil collecting receptacle 13 with which a vacuum pump 18 cooperates. The vacuum pump 18 pumps air out of the oil collecting receptacle 13 into the environment. This air is preferably guided via an air processing device 21. In the oil collecting receptacle 13 there is a negative pressure or partial vacuum of at least 100 mbar below atmospheric pressure, preferably at least 200 mbar below atmospheric pressure, particularly preferably at least 400 mbar below atmospheric pressure. This vacuum or partial vacuum exists both in the oil collecting receptacle 13 and in the interior 12 of the transmission 10, and the evacuation of the interior 12 of the transmission 10 is carried out either via the oil return line 17 or via the separate pressure compensating line 19. When the transmission 10 is incorporated in a drive arrangement of a driven machine, the drive unit and/or the driven machine can also be evacuated or partially evacuated proceeding from the shared oil collecting receptacle 13 at least in a partial space, specifically again either via the corresponding oil return line or via a corresponding separate pressure compensating line. The air processing device 21 can comprise an oil separator and cooler.

The invention enables a simple evacuation or partial evacuation of a transmission and possibly of a driven machine and/or of a drive unit from the shared oil collecting receptacle 13 in each instance. One individual vacuum pump 18 cooperating with the oil collecting receptacle 13 is required for this purpose. Oil return pumps for returning oil to the sump from the evacuated transmission or evacuated driven machine or evacuated drive unit can be omitted.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A transmission (10) for a drive arrangement of a driven machine comprising:
   an oil supply system (14) having at least one oil collecting receptacle (13) from which components of the transmission (10) can be supplied with oil for lubrication and/or cooling; the transmission having at least one partial interior;
   an oil supply line (15) and an oil supply pump (16) connected to the oil collecting receptacle (13) for supplying oil to the respective components;
   an oil return line (17) for returning the oil to the oil collecting receptacle (13);
   a vacuum pump (18) associated with the at least one oil collecting receptacle (13) for evacuating or partially evacuating air from the respective oil collecting receptacle (13) and the at least one partial interior of the transmission (10) indirectly via the oil collecting receptacle (13) by the generation of a defined negative pressure via the vacuum pump (18).

2. The transmission according to claim 1, additionally comprising a separate pressure compensating line (19) for carrying out the evacuation or partial evacuation of the at least one partial interior of the transmission proceeding from the respective oil collecting receptacle (13); wherein the pressure compensating line (19) opens into the respective oil collecting receptacle (13) above a maximum oil fill level (20), and wherein the oil return line (17) opens into the respective oil collecting receptacle (13) below the maximum oil fill level (20).

3. The transmission according to claim 1, wherein the oil return line (17) is leading to the respective oil collecting receptacle (13), and opens into the respective oil collecting receptacle (13) below a maximum oil fill level (20) for carrying out the evacuation or partial evacuation of at least a partial interior of the transmission.

4. The transmission according to claim 1, wherein the vacuum pump (18) evacuates or partially evacuates the entire interior (12) of the transmission (10) by the generation of the defined negative pressure.

5. The transmission according to claim 4, additionally comprising a transmission housing (11) and a pressure compensating line (19); wherein the oil supply system (14) has an individual oil collecting receptacle (13) for the transmission (10); and wherein the oil return line (17) and the pressure compensating line (19) extend between the transmission housing (11) and the oil collecting receptacle (13).

6. The transmission according to claim 1, additionally comprising an air processing device (21) associated with the vacuum pump (18) associated with the respective oil collecting receptacle (13) for cleaning air sucked in from the oil collecting receptacle (13) for the evacuation or partial evacuation.

7. A drive arrangement comprising:
a driven machine (6);
a drive unit (8) for providing driving power; and
a transmission (10) having a transmission housing (11) and being connected between the drive unit (8) and the driven machine (6) to convert the driving power provided by the drive unit (8) and to supply the driving power to the driven machine (6), wherein the transmission (10), comprising:
an oil supply system (14) having at least one oil collecting receptacle (13) from which components of the transmission (10) can be supplied with oil for lubrication and/or cooling; the transmission having at least one partial interior;
an oil supply line (15) and an oil supply pump (16) connected to the oil collecting receptacle (13) for supplying oil to the respective components;
an oil return line (17) for returning the oil to the oil collecting receptacle (13);
a vacuum pump (18) associated with the at least one oil collecting receptacle (13) for evacuating or partially evacuating air from the respective oil collecting receptacle (13) and the at least one partial interior of the transmission (10) indirectly via the oil collecting receptacle (13) by the generation of a defined negative pressure via the vacuum pump (18).

8. The drive arrangement according to claim 7, wherein at least one partial interior of the drive unit can be evacuated by the generation of the defined negative pressure.

9. The drive arrangement according to claim 8, wherein the oil supply system (14) for the drive unit and for the transmission (10) has an individual shared oil collecting receptacle (13), wherein at least one of an oil return line (17) and a pressure compensating line (19) extends in each instance between the transmission housing (11) and the oil collecting receptacle (13) and between the drive unit (8) and the oil collecting receptacle (13).

10. The drive arrangement according to claim 7, wherein at least a partial interior of the driven machine can be evacuated by the generation of the defined negative pressure.

11. The drive arrangement according to claim 10, wherein the oil supply system (14) for the driven machine (6) and for the transmission (10) has an individual shared oil collecting receptacle (13), wherein at least one of an oil return line (17) and a pressure compensating line extends in each instance between the transmission housing (11) and the oil collecting receptacle (13) and between the driven machine (8) and the oil collecting receptacle (13).

* * * * *